United States Patent [19]

Watashi et al.

[11] Patent Number: 4,764,788

[45] Date of Patent: Aug. 16, 1988

[54] COPYING MACHINE EQUIPPED WITH A MOVABLE ORIGINAL HOLDER

[75] Inventors: Masahiro Watashi, Nara; Yasunori Ueno, Osaka; Hirohisa Endo, Kyoto; Tooru Nakamaru; Kazuhiro Mizude, both of Osaka; Keiichi Kishimoto, Nara, all of Japan

[73] Assignee: Mita Industrial Co., Ltd., Osaka, Japan

[21] Appl. No.: 72,073

[22] Filed: Jul. 10, 1987

[30] Foreign Application Priority Data

Jul. 15, 1986 [JP] Japan .................................. 61-166258
Jul. 15, 1986 [JP] Japan .................................. 61-166259
Jul. 15, 1986 [JP] Japan .................................. 61-166260

[51] Int. Cl.[4] ........................................... G03G 15/00
[52] U.S. Cl. .................................. 355/3 R; 355/14 R; 355/75
[58] Field of Search ..................... 355/3 R, 14 R, 75

[56] References Cited

U.S. PATENT DOCUMENTS

| 4,585,329 | 4/1986 | Landa | 355/3 R |
| 4,616,765 | 10/1986 | Katoh | 355/75 X |
| 4,635,010 | 1/1987 | Miyai et al. | 355/3 R |
| 4,636,057 | 1/1987 | Iida et al. | 355/3 R |
| 4,641,947 | 2/1987 | Ishida et al. | 355/3 R |
| 4,713,550 | 12/1987 | Anzai et al. | 355/75 X |

Primary Examiner—A. C. Prescott
Attorney, Agent, or Firm—Jordan and Hamburg

[57] ABSTRACT

A copying machine including an openable original cover, an original holder movably provided on the top of the main body of the copying machine, a locking mechanism provided in the main body of the copying machine and having a projectable lock lever for restricting the movement of the original holder by engaging the receiving parts of the original holder when the original holder is located at a predetermined position, and an ON-OFF detection mechanism for elevating the lock lever a predetermined amount in accordance with the opening and shutting movement of the original cover when the original holder is located at the predetermined position and actuating a switch for driving the detecting means of the original size.

5 Claims, 20 Drawing Sheets

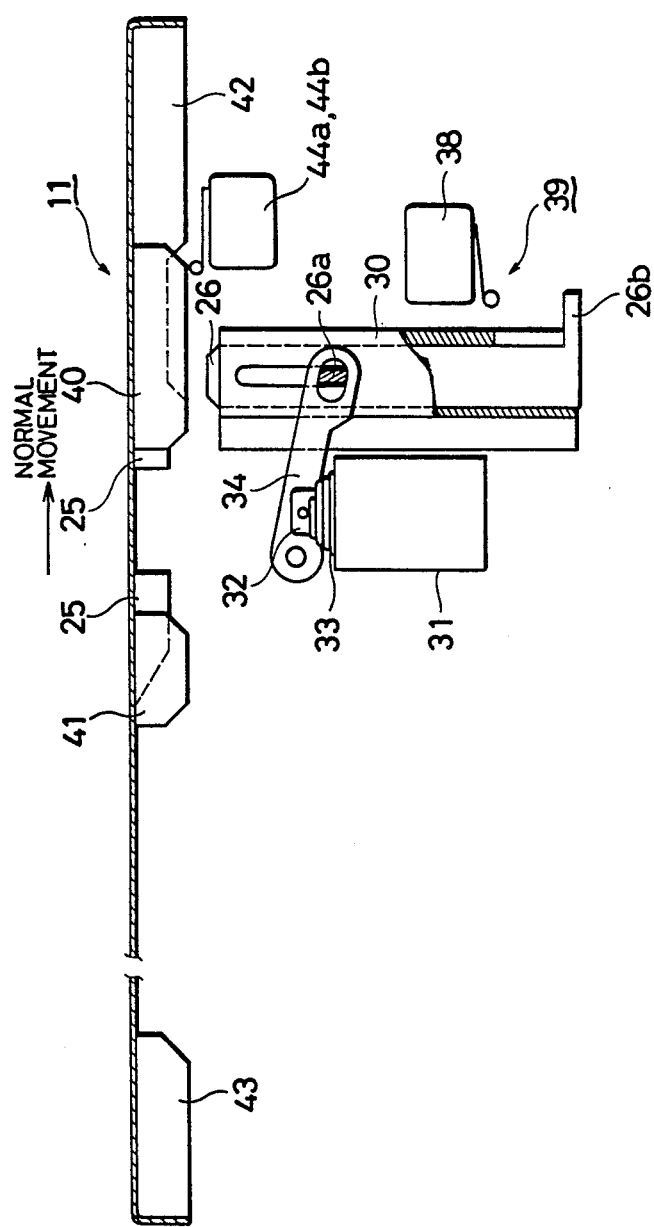

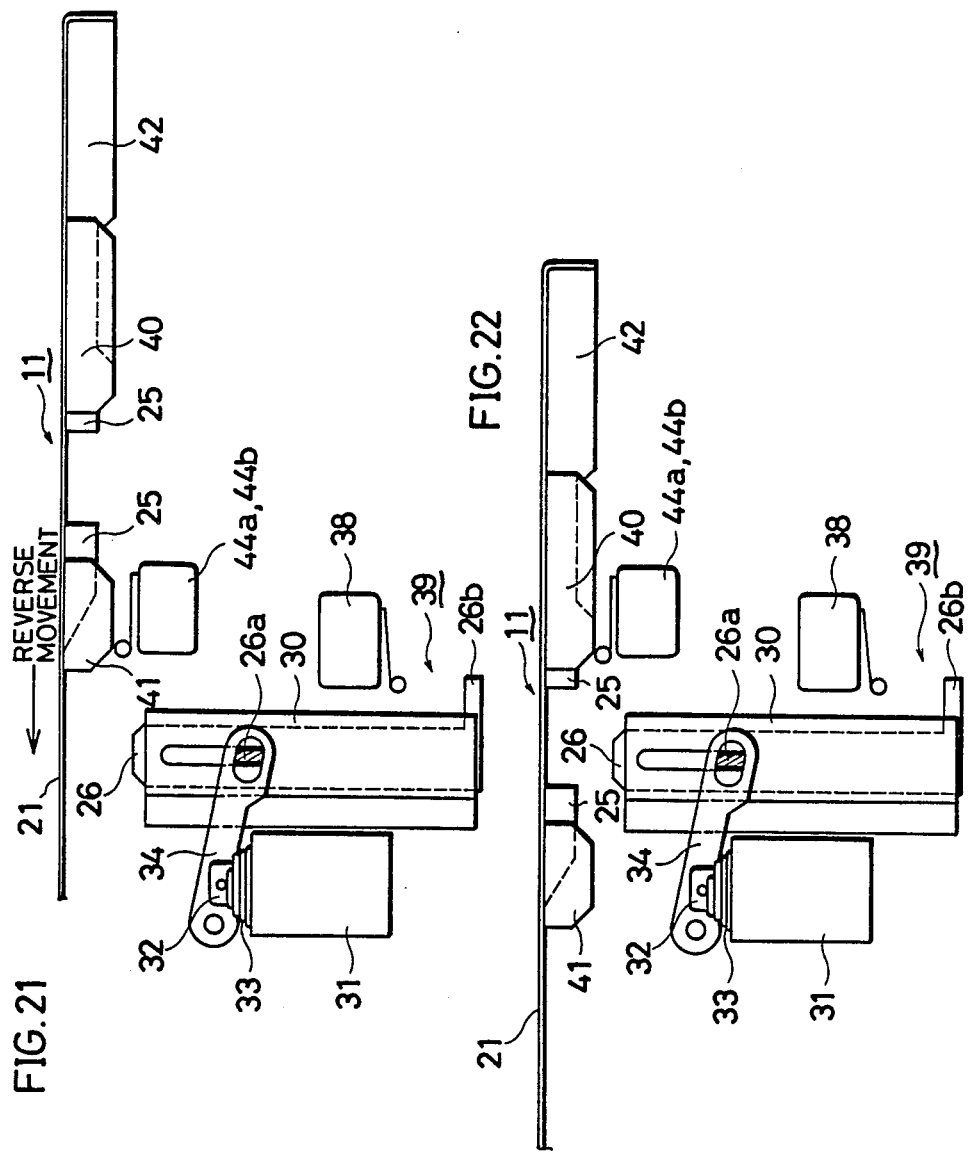

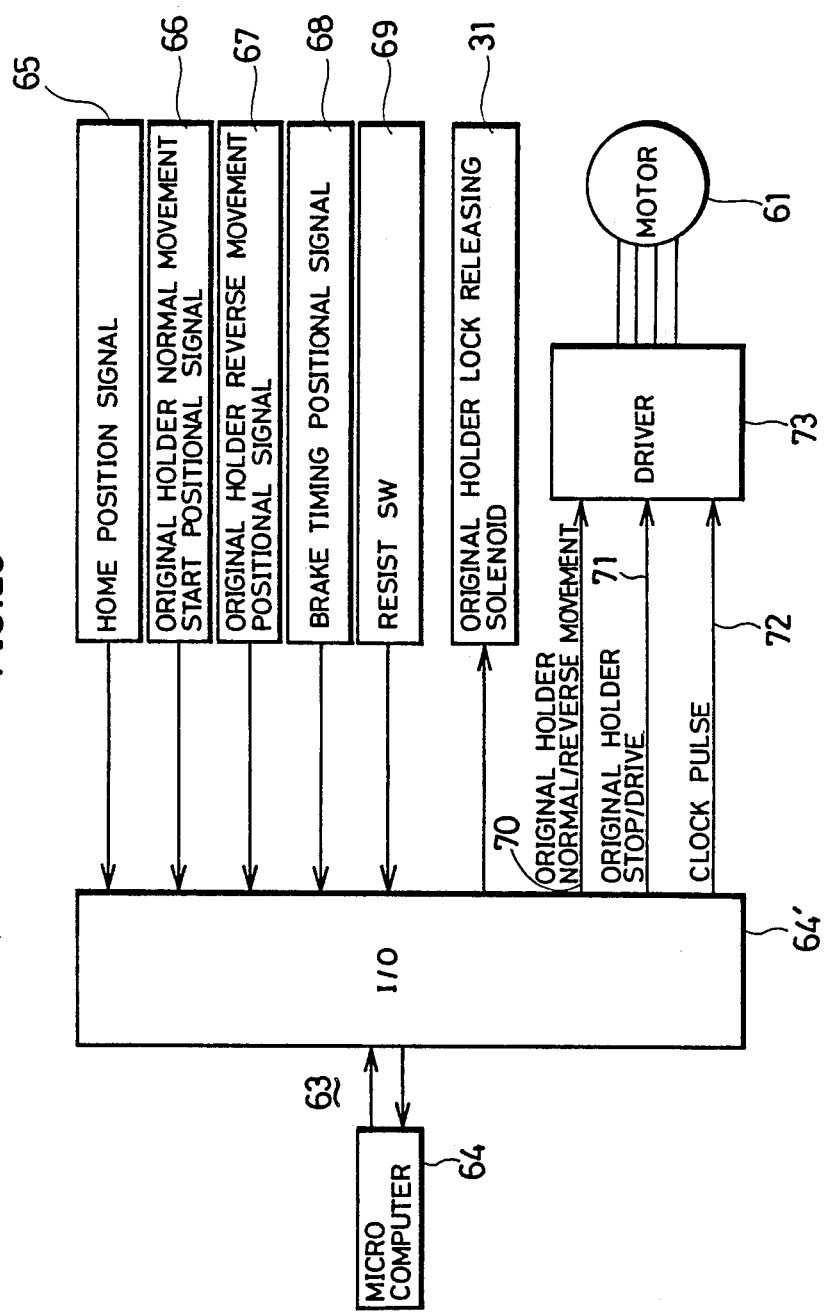

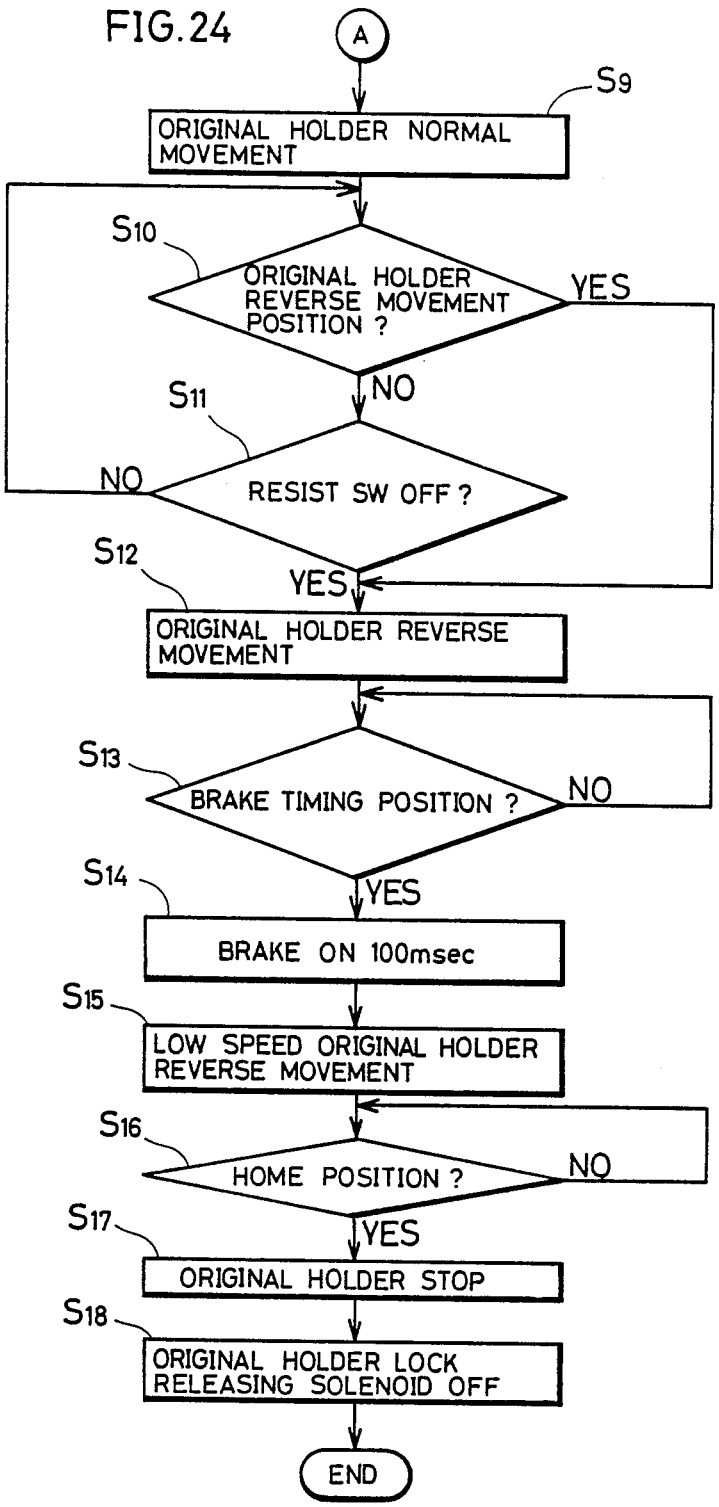

COPYING MACHINE EQUIPPED WITH A MOVABLE ORIGINAL HOLDER

BACKGROUND OF THE INVENTION AND RELATED ART STATEMENT

The present invention relates to a copying machine provided with a reciprocally movable original holder possessing an openable original cover.

In such a movable original holder type copying machine, as shown in Unexamined Patent Publications of No. 164352/1982 and No. 138662/1983, it has been already known to provide a locking mechanism for restricting movement of an original holder and a releasing mechanism for releasing the locking mechanism for the purpose of eliminating the unnecessary movement of the original holder as well as ensuring a reciprocation of the original holder to be stopped.

As shown in Unexamined Patent Pablications of No. 78849/1982 and No. 173733/1984, the copying machine has been known which is equipped with an original size detector for detecting automatically the size of an original placed on an original holder prior to the commencement of a copying operation. Such an original size detector performs the detection of original size from an ON-OFF detection signal issued by a switch which is turned on and off in accordance with the movement of an original cover for covering the original holder. If such an original size detector is applied to the aforementioned movable original holder type copying machine, there will be the following likelihood. When the switch actuatable in accordance with movement of the original cover is provided on the movable original holder, it becomes necessary to provide an electric wire for leading an detection signal from the movable original holder to the main body of an copying machine and consequently there arises the worry of breaking of the electric wire due to the movement of the original holder. Furthermore, when a switch actuatable in accordance with the movement of the original cover is provided in the main body of the copying machine in order to eliminate the aforementioned electric wire for detection, it is necessary to provide a lever for cooperatably connecting the original holder and the original cover so as to cause the switch to actuate in accordance with the original cover, which causes the lever to project from the original holder. Consequently, it becomes to provide a mechanism for drawing in the lever before the copying operation so that the lever may not incur any hindrance when the original holder moves at the copying operation, resulting in more complicated construction.

Since a detecting means for detecting the size of original comprising a light emission component and a light receiving component is usually provided in the main body of a copying machine, an accurate detection of the size of original is requires a fixed position of the original holder with respect to the main body of the copying machine. For this reason, in order to stop the original holder at a fixed position, a locking mechanism for restricting the movement of the original holder becomes necessary.

Besides this, in the case where the main body of a copying machine is divided into an upper unit and a lower unit, the upper unit being able to be rotated so as to perform maintenance inspection or jamming treatment, it is particularly necessary to provide such a locking mechanism for locking the original holder as mentioned above to prevent a shock from giving to the original holder and the main body due to the fact that when the upper unit is opened, the original holder moves rapidly in an inclined direction.

However, in a copying machine eqipped with the afore-mentioned locking mechanism, there is the following trouble. When an operator opens the upper unit to remove a sheet of jammed paper or a moving force is applied to the original holder, the lock mechanism comes into work. Even if the lock is released so that the original holder may move at the copying operation, the releasing will become troublesome. In particular, in a movable original holder type copying machine whose original holder is comparatively larger, releasing of the locking from the workable state gives the releasing mechanism a large burden.

SUMMARY OF THE INVENTION

The object of the present invention is to provide a copying machine comprising a locking mechanism having a lock-lever movable upward and downward for engaging a receiving part of an original holder when the original holder is located at a predetermined position and restricting the movement of an original holder in the main body thereof, and an ON-OFF detection mechanism for elevating the lock-lever by a predetermined distance in accordance with the opening movement of an original cover and thereby actuating a switch for driving an original size detector. Such a construction enables the lock-lever to be used as an actuator for the ON-OFF detection mechanism for detecting the original size at the same time, reducing the number of parts, and assuring a simplified construction and a reduced space. In addition, it is eliminated to provide electric wire for leading the ON-OFF detection signal between the movable original holder and the main body of the copying machine, which avoids a trouble of break of electric wire. Furthermore, it is possible to detect the original size with the original holder held at a predetermined position, which assures accurate detection of the original size.

Further to that, a copying machine according to the present invention which does not have a lever which is operated in accordance with the opening movement of the original cover in order to actuate a switch for detecting the opening movement of the original cover provided on the main body and projected from the original holder to the main body eliminates hindrance to the movement of the original holder. Accordingly, it is not necessary to provide a construction for drawing in the lever, thus assuring a simplified construction.

Still furthermore, since a copying machine of the present invention is such that a rod elevatable in accordance with the movement of the original cover for detecting the opening movement of the original cover is guided inside the afore-mentioned lock-lever, even if a moving force is inadvertently given to the original holder in a lock state and the locking mechanism comes into work, no hindrance is given to the elevating action of the rod for detecting the opening movement of the original cover, and the detection of the original-size is assured.

Yet still furthermore, since a copying machine of the present invention is such that the original holder is moved by a slight distance in a direction opposite to its normal direction at the commencement of the copying operation by a reciprocatively driving means of the original holder while releasing the locking mechanism for original holder, even when the original holder moves due to its dead weight or a moving force is inadvertently given to the original holder and the locking mechanism comes into work, it is possible to assuredly release the locking mechanism and render the mechanism free, and thereby bring the copying machine to the normal copying operation state.

BRIEF DESCRIPTION OF THE DRAWINGS

FIGS. 18-22 are illustrations showing the moving action of the original holder and the operation of the locking mechanism respectively;

FIG. 23 is a block diagram showing a control unit of the reciprocating driving means.

DETAILED DESCRIPTION OF PREFERRED EMBODIMENT OF THE INVENTION

Figure 1:
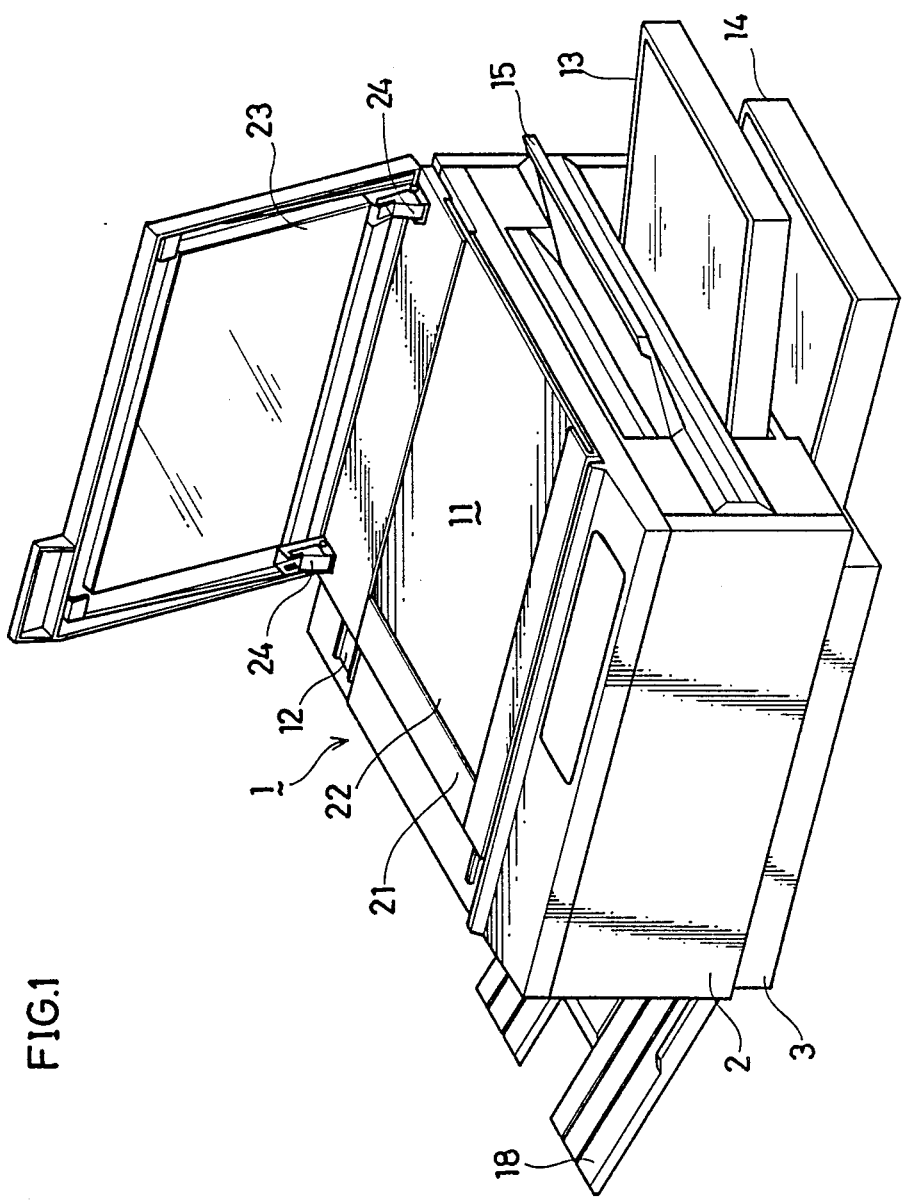
FIG. 1 is a perspective view of an example of a copying machine provided with a locking device for an original holder of the present invention.
Figure 2:
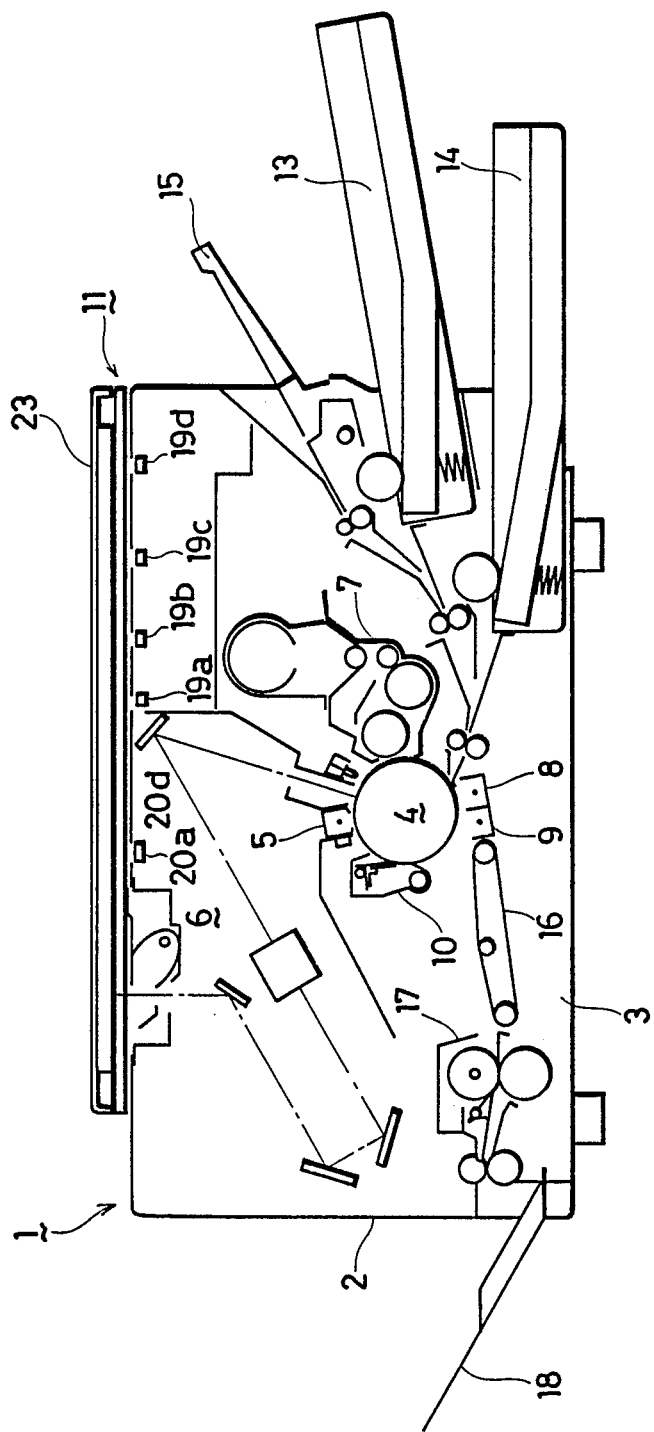
FIG. 2 is a sectional view of the same copying machine.
Figure 3:
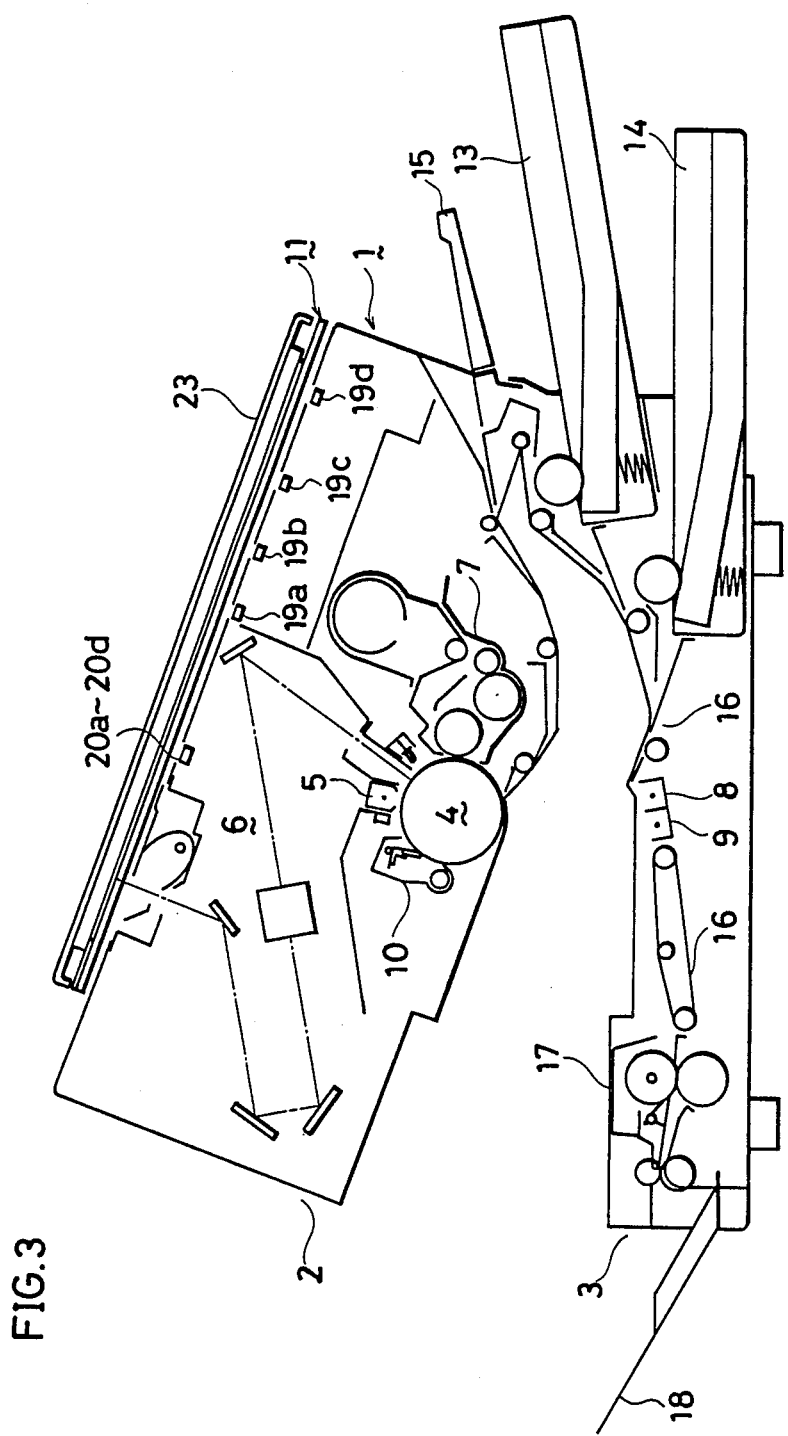
FIG. 3 is a sectional view of the same copying machine whose upper unit is rotated upwards.

A description of embodiments according to the present invention is made in conjunction with the drawings as follows:

Referring first to FIGS. 1-3 showing the whole construction of a copying machine to which the present invention is applied, the main body 1 of the copying machine comprises an upper unit 2 and a lower unit 3, each of which has ends pivotably connected to each other by way of a hinge (not shown), so that they are desirably opened. The upper unit 2 is provided with a rotatable photosensitive body 4 in the form of a drum. Around the photosensitive body 4 are disposed a charger 5, exposure means 6, a developing device 7, a transferring device 8, a separator 9, and a cleaning device 10. An original holder 11 is provided movably in a reciprocating manner along a rail 12 on the top surface of the upper unit 2. In one side of the lower unit 3 are detachably disposed paper supplying cassettes 13 and 14 into which copying paper is housed. A manual paper supplying section 15 is also provided. A carrying passage 16 for carrying copying paper from the paper supplying devices to a transferring section including the aforementioned photosensitive body 4 and the transferring device 8 is provided. The carrying passage 16 is further extended through the separator 9 to the opposite side in an intermediate portion of which a fixing device 17 is arranged. A copy receiving tray 18 is provided on the end of the passage.

In such a copying machine as the above-mentioned construction, when performing maintenance inspection of each device in the main body 1 of the copying machine or removing jammed paper, the upper unit 2 is rotated upward as shown in FIG. 3. At this time, sliding-down in an inclined direction of the original holder is prevented by a locking mechanism 27 which is referred to later.

Opposite the afore-mentioned original holder 11 and in the upper inside of the main body 1 of the copying machine are provided detecting sensors 19a-19d and 20a-20d including light emitting elements and receiving elements which are adopted for detecting the size of an original being placed in the original holder 11.

Figure 4:
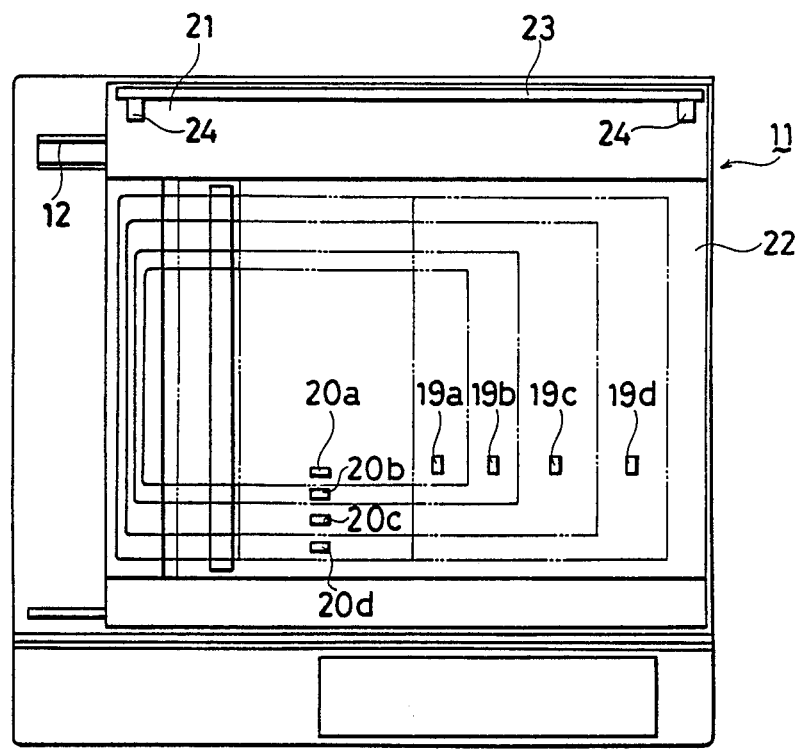
FIG. 4 is a top view of the original holder of the same copying machine.

Referring to FIG. 4 showing the top of the main body of the copying machine, the original holder 11 comprises an original holder frame 21, a contact glass 22 fixed to the frame 21 on which an original is to be placed, and an original cover 23 openably mounted to opposite ends of the rear of the frame 21 by hinge joints 24, 24. FIG. 4 shows a state in which the original cover 23 is opened. The detecting sensors 19a-19d and 20a-20d are arranged laterally and longitudinally correspondingly to the predetermined size of the original respectively under the contact glass 22 and in the main body 1.

Figure 5:
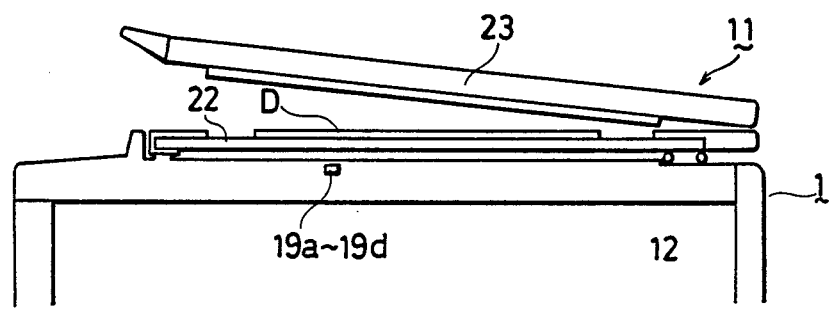
FIG. 5 is a side view of the same original holder.

FIG. 5 shows a side of the original holder 11 of the copying machine. When the original cover 23 is closed to a predetermined angle about the hinge joints 24, the size of the original D placed on the contact glass 22 is detected by an operation timing of ON-OFF detection mechanism 39 which is referred to later.

Figure 6:
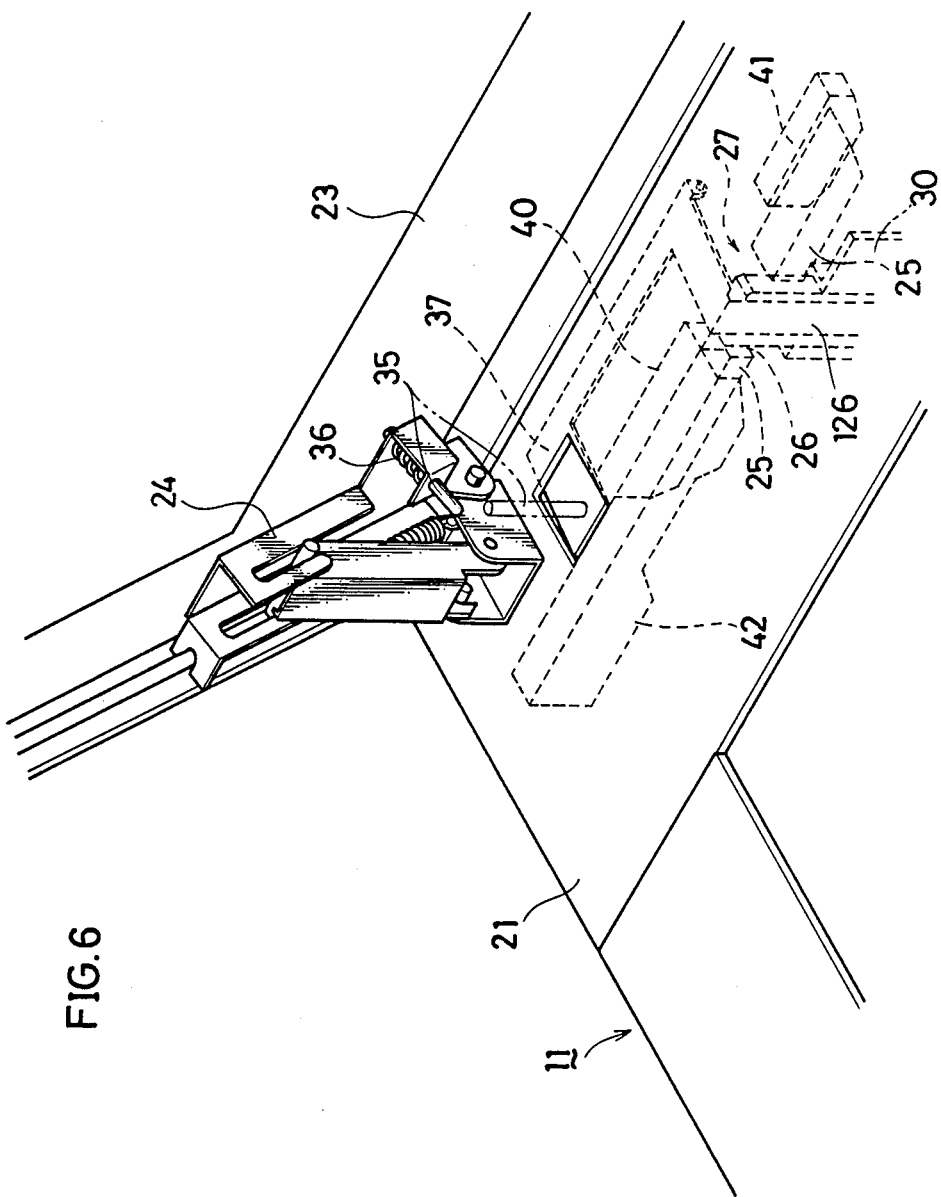
FIG. 6 is a perspective view of a hinging portion of the same original holder.
Figure 7:
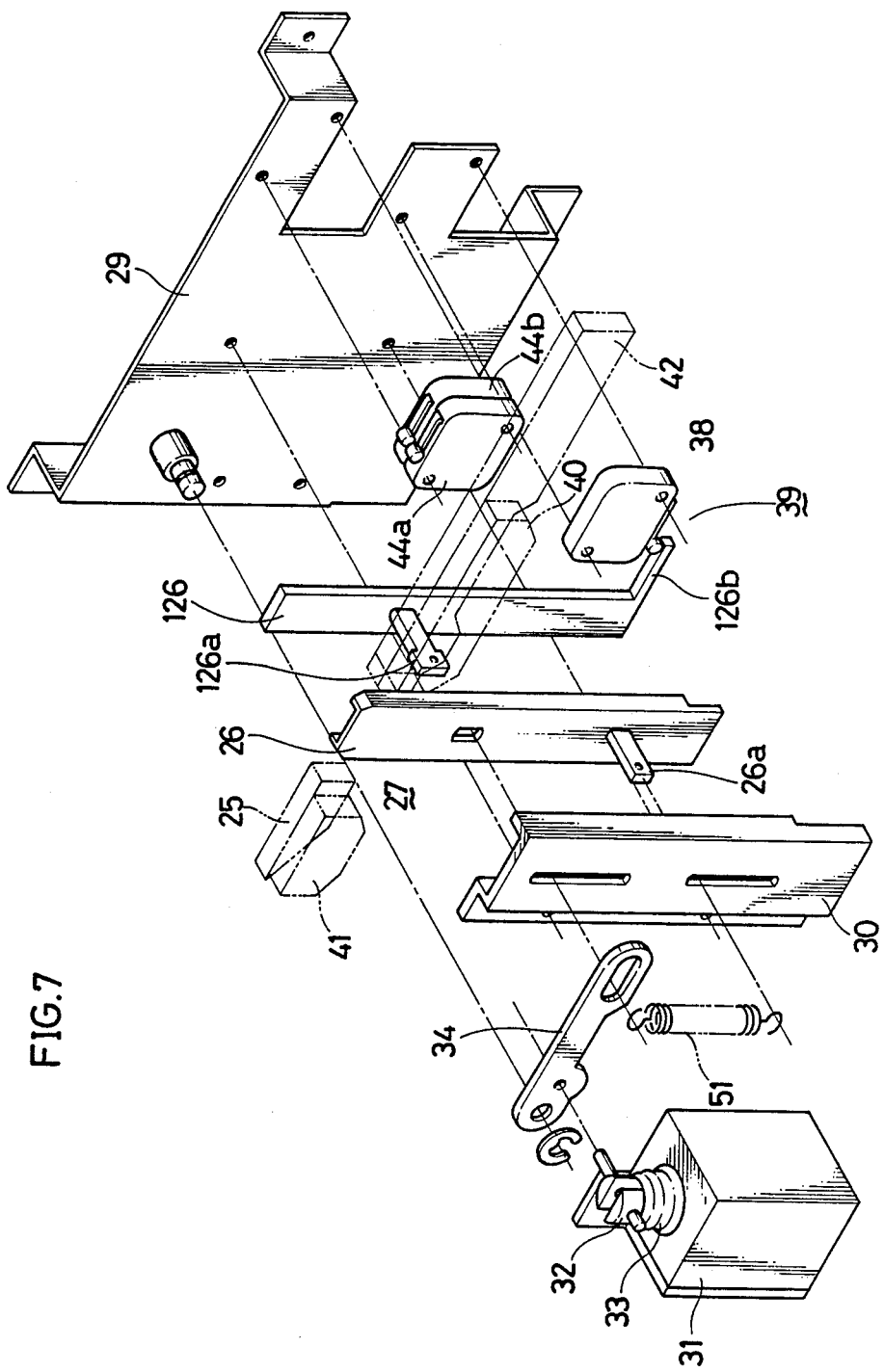
FIG. 7 is an exploded perspective view of the principal portion of a locking mechanism and an ON-OFF detection mechanism in the same device.

FIGS. 6 and 7 illustrate the construction of the locking mechanism 27 of the original holder 11 and the ON-OFF detection mechanism 39 of the original cover 23 which provides the timing for detecting the size of the original. FIGS. 8-13 are views illustrating the construction and the operation of each of the afore-mentioned mechanisms. A description is made in accordance with these drawings as follows:

A position at which the exposure device 6 in the main body 1 of the copying machine illuminates an original placed on the original holder 11 is always within an area which is covered by the original holder 11 irrespectively of the reciprocating movement of the original holder 11. The locking mechanism 27 is provided within the afore-mentioned area of the main body 1 of the copying machine which has a projectable lever 26 for restricting the movement of the original holder 11.

Receiving parts 25 25 are provided on underside of the frame 21 of the original holder 11 in such a way that when the original holder 11 is located at a predetermined position, namely a home position, the lock lever 26 is held between the receiving parts 25 and 25.

The locking mechanism 27 comprises a mounting plate 29 provided on a side plate 28 attached to the main body 1 of the copying machine, a guide plate 30 attached to the mounting plate 29 for guiding the lock lever 26 elevatably, an ON-OFF detection rod 126 for the original cover elevatably guided in the lock lever 26, and a lock releasing solenoid 31 attached to the mounting plate 29 for releasing the locking state. The top end of a plunger 32 of the solenoid 31 on which a spring 33 is provided is pivotally connected to an intermediate portion of an arm 34 which is rotatable about one end thereof. The other end of the arm 34 is connected to a projection 126a of the ON-OFF detection rod 126. Between the projection 26a of the lock lever 26 and the projection 126a of the ON-OFF detection rod 126 is provided a spring 51 for drawing these projections 26a and 126a to each other. The mechanism is constructed in such a way that when the solenoid 31 is in the OFF state, a stretching force of the spring 33 pushes the ON-OFF detection rod 126 and the lock lever 26 upward and a positional relation between inserting grooves formed on the guide plate 30 for respective projections 126a and 26a may lead the top end of the ON-OFF detection rod 126 to a position slightly higher than the top end of the lock lever 26. The springiness force of the spring 33 is larger than that of the spring 51.

Under such a construction, when the solenoid is in the OFF state, the stretching force of the spring 33 pushes the ON-OFF detection rod 126 upward by use of the arm 34 and the lock lever 26 is then pushed upward. When the original holder 11 is located at a predetermined home position, the lock lever 26 comes into a space between the receiving parts 25 and 25 to lock the original holder 11. On the other hand, when the lock releasing solenoid 31 is turned on, the plunge 32 is drawn and the ON-OFF detection rod 126 is then pushed down by use of the arm 34. Consequently, the lock lever 26 is pushed down and the locking state is then released.

Furthermore, a lever 35 is provided on the hinge 24 of the original cover 23. The lever 35 is biasingly pushed downward by a spring 36. When the original holder 11 is located at the afore-mentioned predetermined position, the lever 35 slightly elevates the ON-OFF detection rod 126 by use of a presser plate 37 by opening and shutting the original cover 23. Accordingly, a switch 38 for driving the detecting means of the original size is operated in accordance with the elevating movement of the rod 126 by the projection 126b of the rod. In other words, the lever 35, the presser plate 37, the rod 126 and the switch 38 which are provided in the hinge 24 constitute an ON-OFF detection mechanism 39 for detecting the opening and shutting of the original cover 23 and providing a timing for driving the detecting means of the original size. The springiness force of the spring 36 is larger than that of the spring 33 provided in the solenoid 31.

The presser plate 37 disposed between the lever 35 provided in the hinge 24 and the rod 126 is rotatably supported under the frame 21 to a given extent so that the lever 35 can come into touch with the upper surface of the presser plate 37 through an opening provided in the frame 21. Such a construction is adopted for a reason that while the rod 126 is provided at a position which is always covered by the original holder 11, the lever 35 in the hinge 24 of the original cover 23 is provided at a position which is apart from the position of the rod 126.

Under the frame 21 of the original holder 11 is provided cams 40, 41, and 42 having a predetermined shape. Microswitches 44a and 44b are provided on the mounting plate 29 in the main body 1 of the copying machine corresponding to the cams 40, 41, and 42. A position of the original holder 11 is detected by these cams 40, 41, and 42 and microswitches 44a and 44b. The movement of the original holder 11 and the driving of the lock releasing solenoid 31 are controlled in accordance with a detected signal.

The ON-OFF detection mechanism 39 is operated when the original holder 11 is located at the home position and the locking mechanism 27 holds the original holder 11 in the lock state, i.e. the lock lever 26 and the rod 126 are projected upward. Even if the rod 126 elevates to a level which is enough to operate the ON-OFF detection mechanism 39 corresponding to the movement of the original cover 23, the locking mechanism 27 is maintained.

Figure 8:
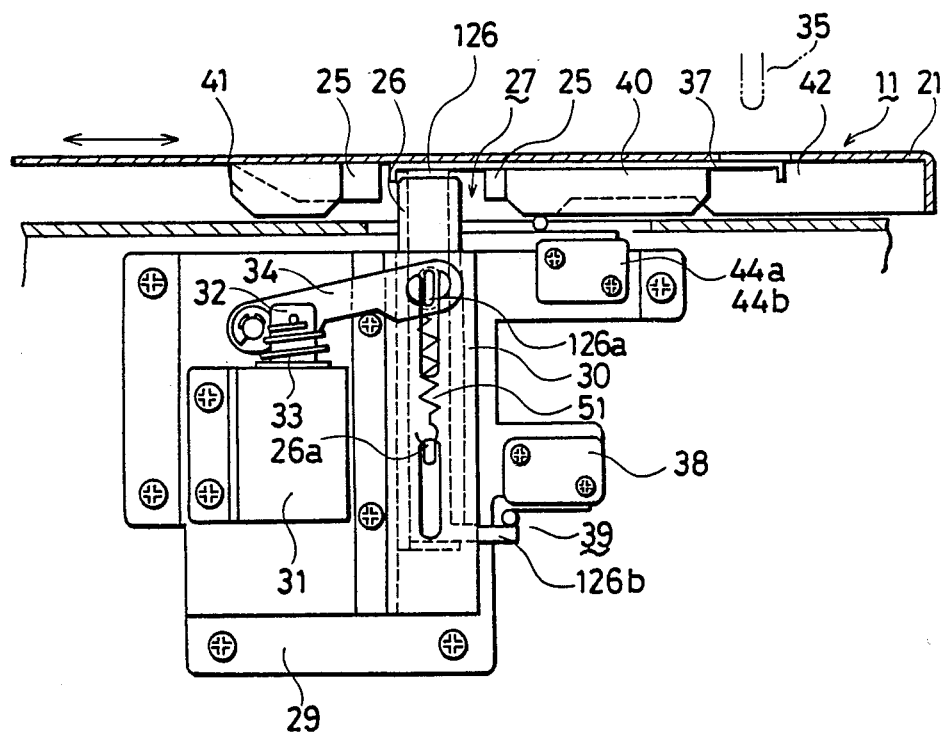
FIG. 8 is a front view of the principal portion of the same locking mechanism and the same ON-OFF detection mechanism.
Figure 9:
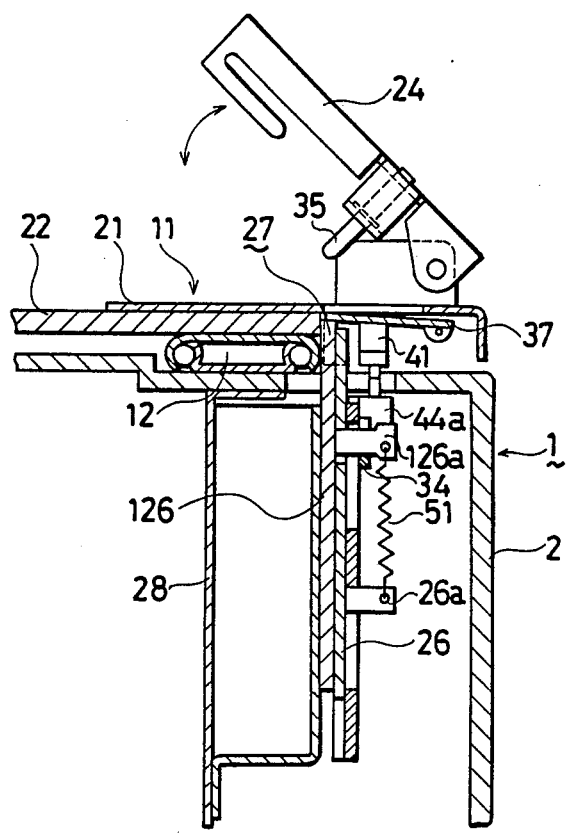
FIG. 9 is a side sectional view of the same principal portion thereof.
Figure 10:
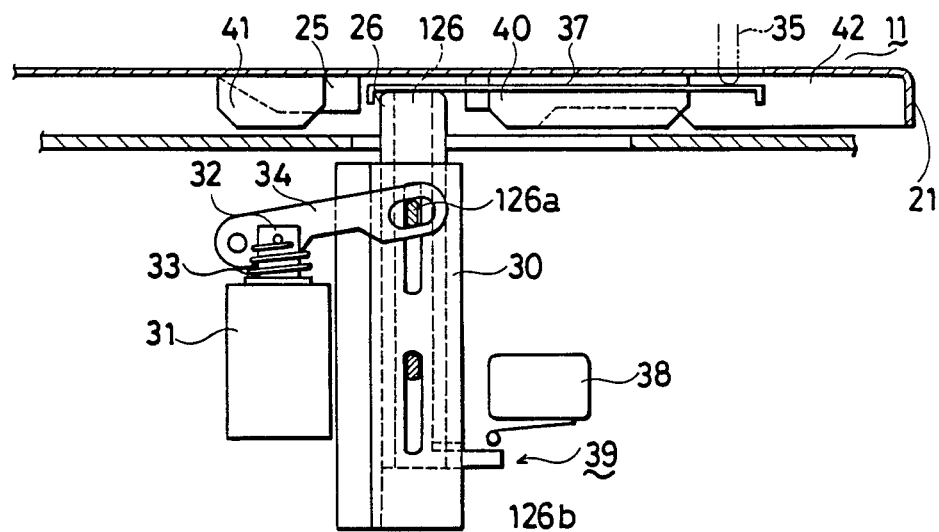
FIG. 10 is a front view of the locking mechanism in which the original holder is locked and the original cover is closed.
Figure 11:
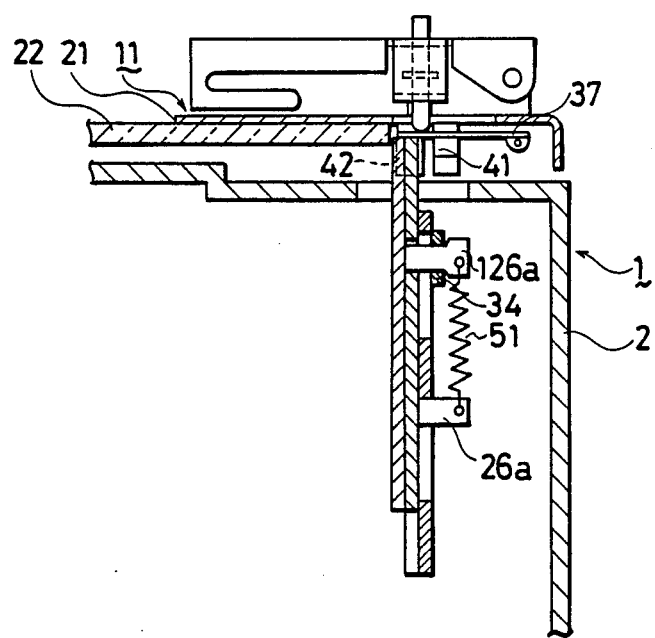
FIG. 11 is a side sectional view of the mechanism of FIG. 10.

All of FIGS. 8-13 illustrate a state where the original holder 11 is located at a predetermined position, i.e. a home position. FIGS. 8 and 9 show a state where the lock lever 26 comes into a space between the receiving parts 25 and 25 of the original holder 11 and the original holder 11 is locked and the original cover 23 is opened. FIGS. 10 and 11 show a state where the original cover 23 is closed.

As shown in FIG. 8, when the original cover 23 is opened with the original holder 11 locked, the spring 33 pushes the ON-OFF detection rod 126 together with the lock lever 26, and the switch 38 for driving the detecting means of the original size is in the state of ON.

Next, when the original cover 23 is closed to a fixed angle, the lever 35 provided in the hinge 24 pushes down the presser plate 37 by a predetermined distance and only the ON-OFF detection rod 126 is then pushed down as shown in FIGS. 10 and 11. Consequently, the switch 38 is turned off and the detecting means of the original size is then driven. Moreover, since the lock lever 26 is biasingly pushed down by the spring 51, there is no likelihood that when the rod 126 is pushed down, the lock lever 26 is pushed down together with the rod 126.

Figure 12:
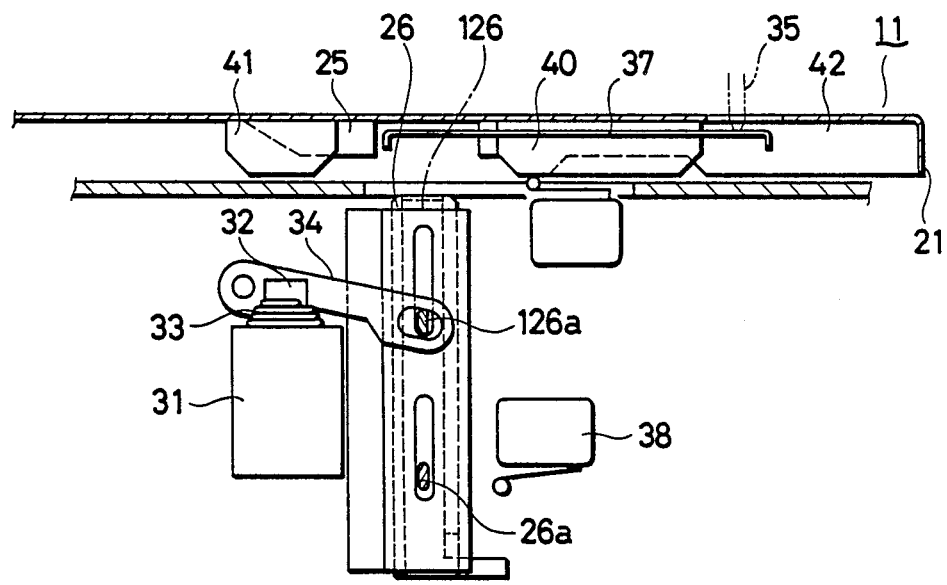
FIG. 12 is a front view of the mechanism in which the locking is released.
Figure 13:
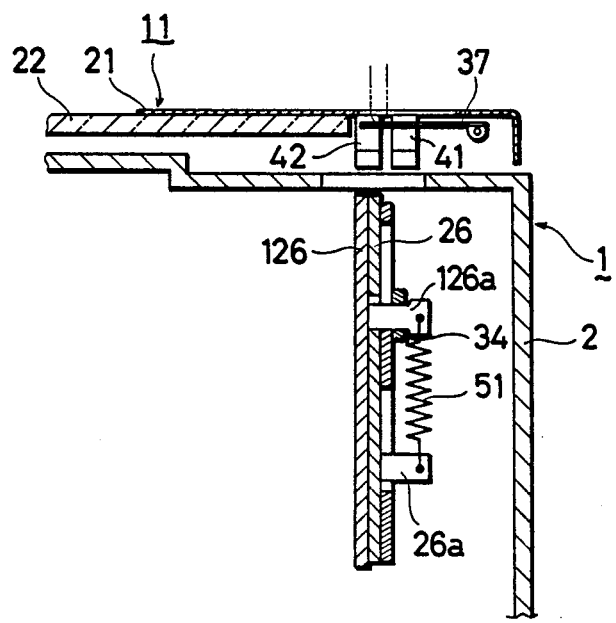
FIG. 13 is a side sectional view of the mechanism of FIG. 12.

Under such a state, even if a moving force liable to move the original holder 11 to one direction is applied to the original holder 11 and the lock lever 26 and one of receiving parts 25 are pressed to each other and come into an unmovable state, the ON-OFF detection rod 126 elevates to the predetermined distance along with the opening movement of the original cover 23 irrespectively of the operation of the lock lever 26. Accordingly, when the original cover 23 is closed, the ON-OFF detection rod 126 is assuredly pushed down to operate the switch 38. Furthermore, when the solenoid 31 is turned on, the ON-OFF detection rod 126 is pushed down as shown in FIGS. 12 and 13. Subsequently, the lock lever 26 is pushed down and the lock of the original holder 11 is released.

Although the afore-mentioned embodiment discloses the arrangement in which the ON-OFF detection rod 126 is guided along the inner side of the lock lever 26, the present invention is attainable at least by elevatably providing the ON-OFF detection rod 126 in a working area of the lock lever 26 in the moving direction of the original holder 11.

Figure 14:
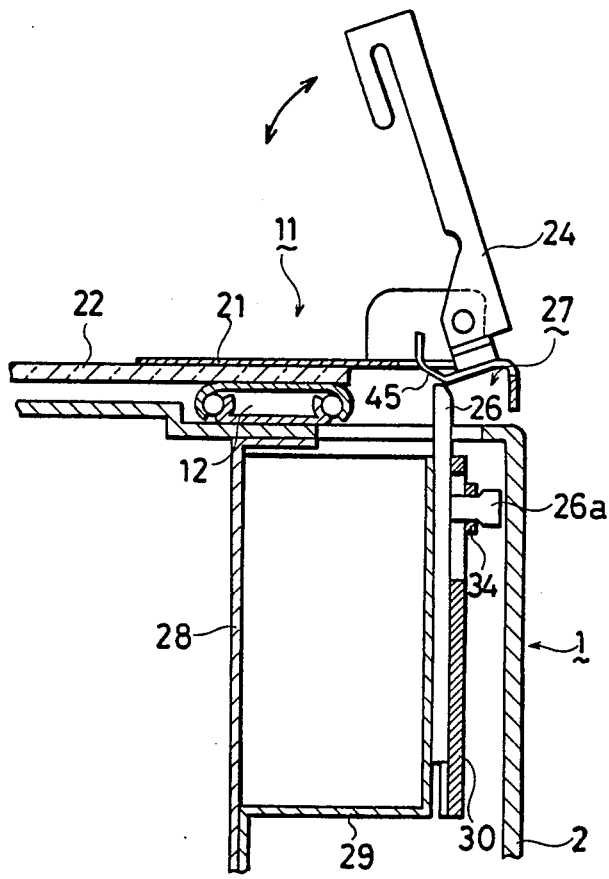
FIG. 14 is a side sectional view of the locking mechanism and the ON-OFF detection mechanism of another embodiment in which the original cover is opened.
Figure 15:
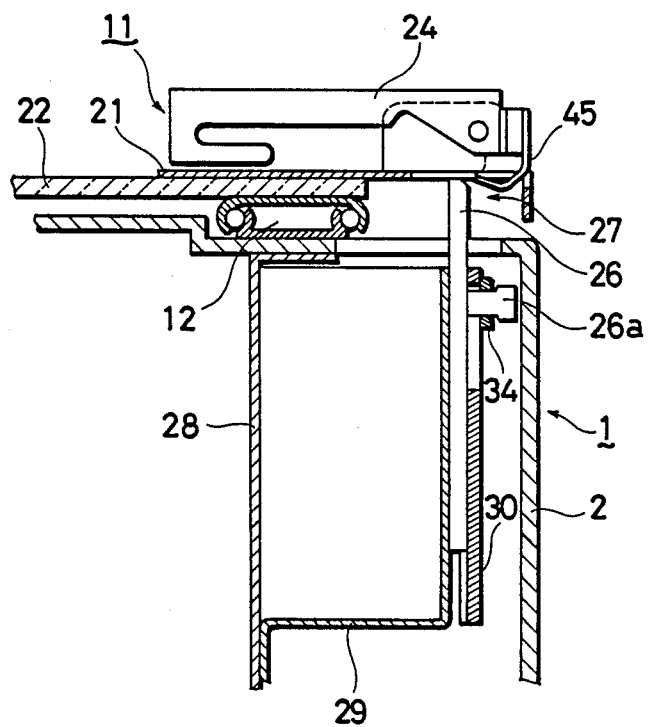
FIG. 15 is a side sectinal view of the embodiment of FIG. 14 in which the original cover is closed.

FIGS. 14 and 15 show the construction of another embodiment of the locking mechanism 27 and the ON-OFF detecting mechanism 39 in which a cam lever 45 is integrally provided with the hinge 24, so that the lock lever 26 can be elevated by cam lever 45 in accordance with the movement of the original cover 23.

Under this embodiment, as shown in FIG. 14, when the original cover is opened, the lock lever 26 is pushed slightly down by the cam lever 45 and a switch for driving the detecting the original size (not shown) is in the state of OFF.

Next, as shown in FIG. 15, when the original cover is closed to a predetermined angle, the cam lever 45 comes off from the lock lever 26 and the lock lever 26 is pushed upward by a spring provided in the solenoid. Consequently, the switch for driving the detecting means of the original size is turned on and the original size is detected. It will be noted that for the reason that the original holder 11 is locked even when the original cover is opened, i.e., the lock lever 26 is pushed down, similarly to the first embodiment, it is sufficient that the lock lever 26 does not move longer than the distance necessary to turn on and off the switch. At this time, the logic of a circuit for driving the detecting means of the original size is made in the reverse of the first embodiment.

All the afore-mentioned embodiment in which the lock lever 26 of the locking mechanism 27 for locking the original holder 11 is also used as an actuator for the ON-OFF detection mechanism 39 for actuating the switch 38 for driving the detecting means of the original size in accordance with the movement of original cover 23 needs a reduced number of parts, a simplified mechanism and a reduced space. Furthermore, the present invention in which detecting switch 38 is not provided in the original holder 11 eliminates the necessity of providing the electric wire between the original holder 11 and the main body 1 of the copying machine. Consequently, there is no lilelihood that the movement of the original holder 11 breaks the electric wire. Furthermore, since the original size is always detected, when the original holder 11 is located at a predetermined position, no mistake is made in detecting the original size.

Figure 16:
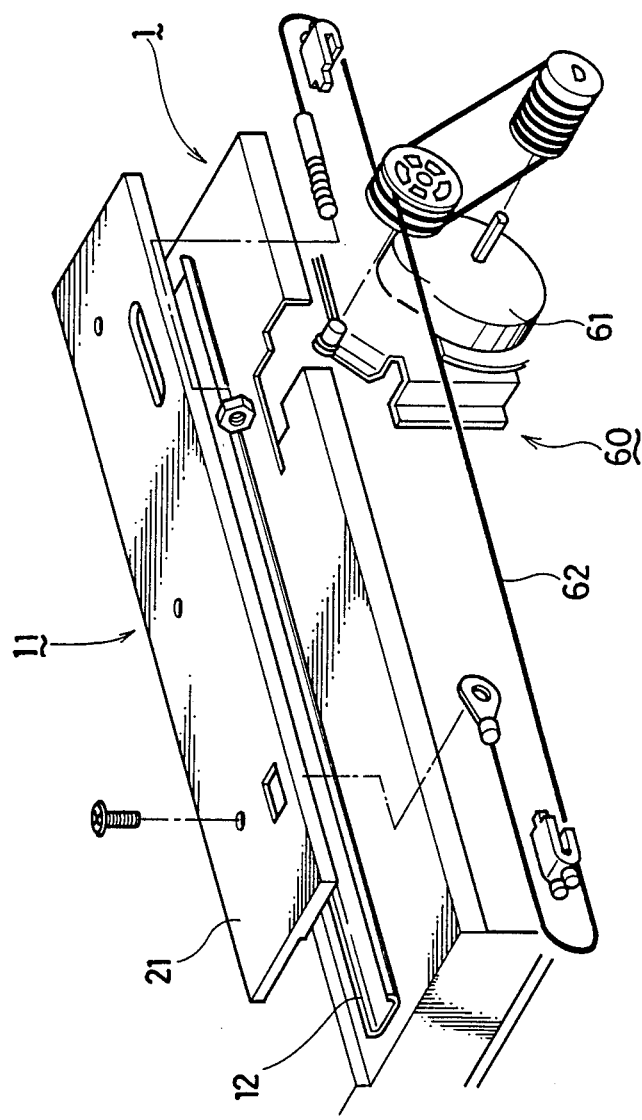
FIG. 16 is a perspective view of reciprocating driving means of the device.

FIG. 16 illustrates the construction of means 60 for reciprocatively driving the original holder 11. The reciprocatively driving means 60 comprises a motor 61 and a wire rope 62 for connecting a pulley provided on an output shaft of the motor 61 and the original holder 11.

Figure 17:
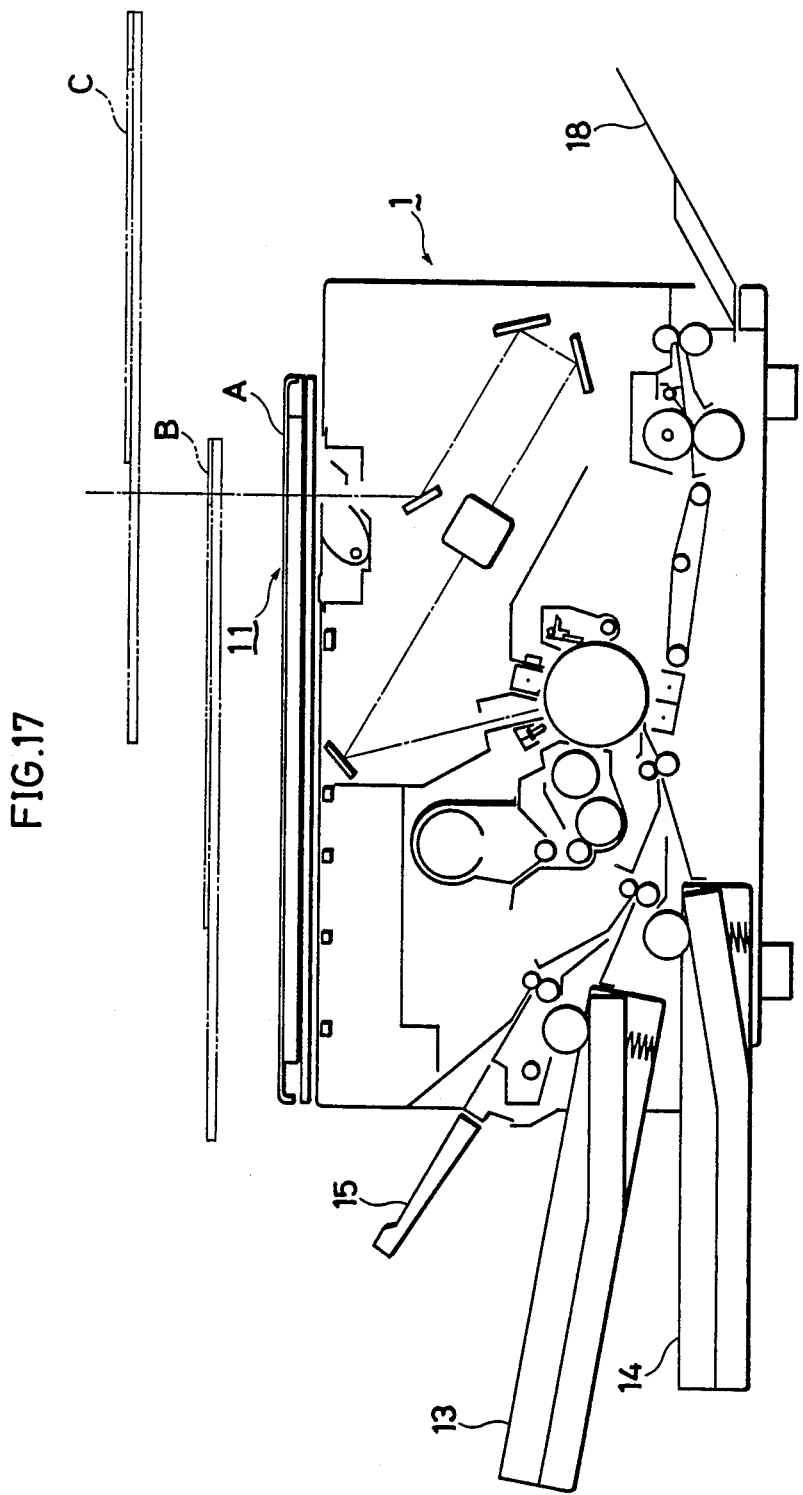
FIG. 17 is an illustration showing the moving action of the original holder from the rear of the main body of the copying machine.

FIG. 17 is a schematic rear view of the main body of the copying machine illustrating the movement and operation of the original holder 11. At A is indicated a state that the original holder 11 is located at a home position. At B is indicated a state that the original holder 11 is moved back from the state A to a position where the forward end of an original corresponds to the position of the exposure optical system and the forward movement is started. At C is indicated a state that the original holder 11 moves from the afore-mentioned state B to a position at which the backward movement of the original holder 11 starts. When the original holder 11 is located at the state A, the locking state is obtained by actuating the locking mechanism.

Figure 18:
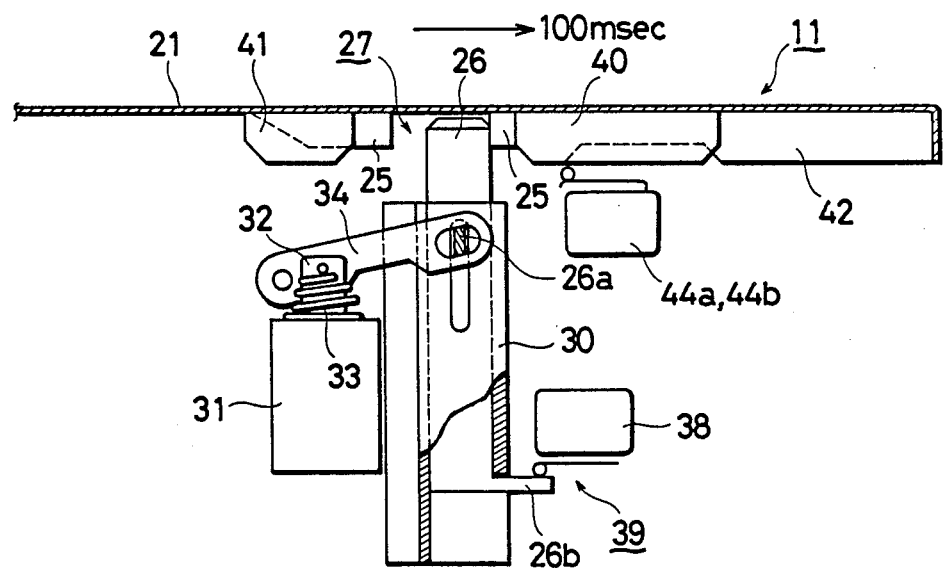

FIGS. 18-22 are views illustrating the construction and operation of the original holder 11 and the locking mechanism 27. The following description is made in conjunction with these drawings:

In a state where the locking mechanism 27 is in the locked state, i.e. the lock lever 26 is pushed up to a position between the receiving parts 25 and 25 of the original holder 11 as shown in FIG. 18, it is assumed that when the copying operation is started by turning on the lock releasing solenoid 31 to release the locking mechanism 27, the original holder 11 moves to one direction due to its dead weight, and the lock lever 26 is pressed to one of the receiving parts 25 and 25 by an unexpected force.

In the afore-mentioned occasion, the present invention performs the following operation. The original holder 11 is moved forward (in an direction opposite to a normal moving direction) by a small distance (e.g. 100 msec) by actuating the driving means 60 before the original holder 11 is moved from the state A of FIG. 17 to the state B, namely the reverse movement (i.e. normal moving direction). Consequently, even if the lock lever 26 is pressed to one of the receiving parts 25 and 25 and comes into an unmovable state as shown in FIG. 18, such an unmovable state is eliminated in a moment. Consequently, at this time, the lock lever 26 is pushed down without a failure by the lock releasing solenoid 31 as shown by an imaginary line of FIG. 19 and the lock is then released.

Figure 19:
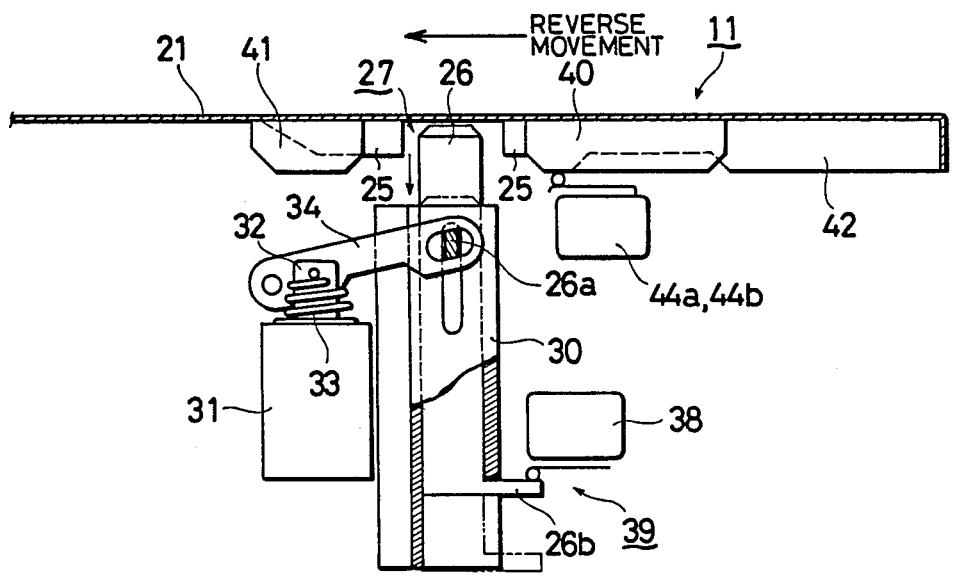

Subsequently, the original holder 11 starts the reverse movement as shown in FIG. 19. In other words, the original holder 11 is reversely moved from the state A of FIG. 17 to the state B.

Thereafter, the original holder 11 reaches the starting point of the usual copying operation, i.e. the forward movement and changed to the forward movement as shown in FIG. 20. When reaching the reverse position, the original holder 11 is changed to the reverse movement from the state C of FIG. 17 to the state B. The original holder 11 is given a braking force by the reciprocatively driving means 60 before completing the reverse movement as shown in FIG. 21. When the original holder 11 returns again to the home position as shown in FIG. 22, the lock releasing solenoid 31 is turned off and the lock lever 26 is pushed up by stretching force of the spring 33, attaining the locking state again.

Timing for actuating the solenoid 31 and the reciprocatively driving means 60 is obtained from signals forwarded by the cams 40, 41, 42, and 43, and the switches 44a and 44 which are provided on the original holder 11.

FIG. 23 is a block diagram of a control unit 63 for controlling the operation of the reciprocatively driving means 60. The control unit 63 comprises a microcomputer 64, an I/O device 64' and means for inputting signals such as home position signal 65, original holder normal movement starting position signal 66, original holder reverse movement position signal 67, braking timing position signal 68, and resist-switch 69. In the other hand, original holder normal/reverse signal 70, original holder stop/drive signal 71, and a clock pulse 72 for determining the moving speed of the original holder are output from the control unit 63 to a driver 73. A motor 61 in the reciprocatively driving means 60 is driven by the driver 73. A signal for driving the lock releasing solenoid 31 is also output. Each of the afore-mentioned input signals 65-68 is obtained from the afore-mentioned cams 40, 41, 42, and 43 and the switches 44a and 44b.

Figure 24:
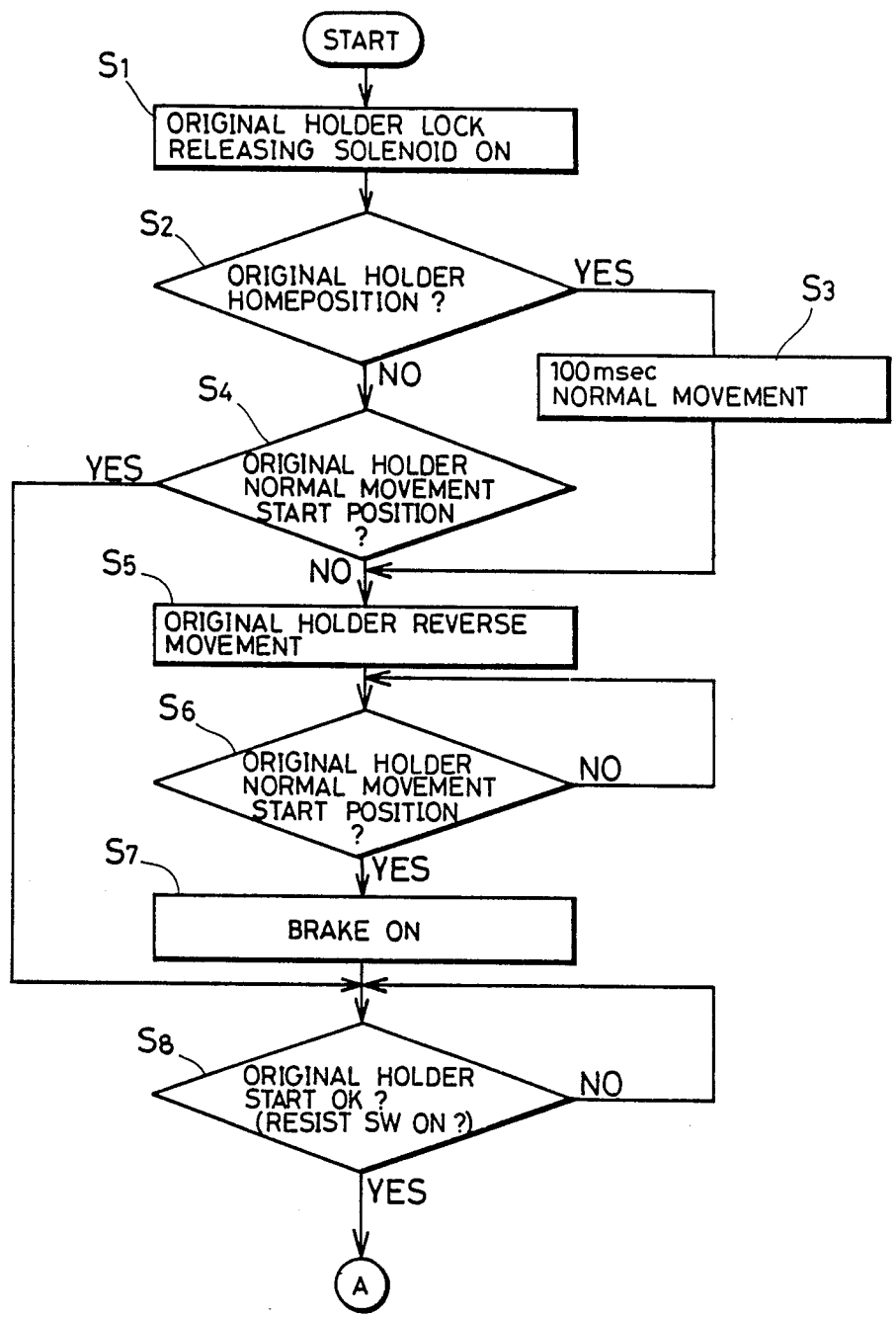
FIG. 24 is a flowchart showing control of the control unit.

FIG. 24 is a flowchart showing the control operation of the reciprocatively driving means 60 by the afore-mentioned control unit 63 at the commencement of copying operation.

The following description will be made in accordance with the flowchart. At step S1, the original holder lock releasing solenoid is turned on.

At step S2, it is checked whether or not the original holder is located at the home position. When the answer is YES, the operation proceeds to step S3 at which the original holder is moved in the normal direction for a small time, e.g. only for 100 msec. This operation corresponds to the state of FIG. 18. When NO, it proceeds to step S4 at which it is checked whether or not the original holder is located at the normal movement start position. When YES, it proceeds to step S 8. In the case that the original holder 11 is changed to the normal movement at step S3 and a judgement at step S4 is NO, the original holder is changed to the reverse movement at step S5. This stage corresponds to the state of FIG. 19. At step S6, it is checked whether or not the original holder is located at the normal movement start position. When YES, the braking is applied. The braking is electrically applied to the motor 61 by signal 70 from the driver 73.

At step S8, it is checked whether or not the original holder can be started, i.e. whether or not the copy paper arrives into a resist-roller and the resist-switch is turned on. When YES, the original holder changed to the normal movement at step S9. This step corresponds to the state of FIG. 20.

At step S10, it is checked whether or not the original holder is located at the reverse position. When the answer is YES, it proceeds to step S12 at which the original holder is changed to the reverse movement. When No, it is checked whether or not the resist switch is turned off at step S11. When the answer is NO, it returns to step S10. When the answer comes into YES, it proceeds to step S12 at which the reverse movement is executed. At step S13, it is checked whether or not the original holder is at the braking timing position. When YES, the braking is applied for 100 msec. This step corresponds to the state of FIG. 21.

At step S15, the original holder is moved in the reverse direction at a slow speed. At step S16, it is checked whether or not the original holder is at the home position. When YES, the original holder is stopped at step S17. This step corresponds to the state of FIG. 22. At step S18, the lock releasing solenoid is turned off and the original holder is locked. Then, the operation is completed.

In the afore-mentioned operation, before entering the normal movement (step S9) of the original holder, that is the copying operation, the original holder is changed to the reverse movement (step S5). In other words, the original holder 11 is changed from the state A of FIG. 17 to the state B. However, in a copying machine which does not have the stop that the original holder is changed to the reverse movement before the normal movement, it is proper to replace the normal movement executed for a small time at step S3 with the reverse movement. The movement required at step S3 is satisfactorily attained by moving the original holder in an opposite direction to an initially normally moved direction. Accordingly, even if the lock mechanism is put into work, the lock state can be assuredly released.

What is claimed is:

1. A copying machine equipped with a movable original holder comprising:

an original holder movably provided on the top of the main body of copying machine and having a receiving part at a predetermined position thereof for engaging and disengaging a lock lever, a original cover openably provided on the top of said original holder, a locking mechanism provided in the main body of copying machine having a projectable lock lever for engaging and disengaging said receiving part so as to restrict and release the movement of said original holder when said original holder is located at the predetermined position, and means for driving said lock lever, means provided in the main body for detecting the original size and a switch for driving said detecting means, and an ON-OFF detection mechanism for elevating said lock lever to a predetermined amount in accordance with the opening and shutting movement of said original cover when said original holder is located at the predetermined position and actuating said switch.

2. A copying machine equipped with a movable original holder as defined in claim 1, wherein the switch for the original size detection means is actuated in accordance with the opening and shutting movement of said original cover with said original holder locked by said locking mechanism.

3. A copying machine equipped with a movable original holder as defined in claim 1 wherein said lock lever is constructed in such a way as to be projectable from the top of the main body of said copying machine which is always covered by said original holder.

4. A copying machine equipped with a movable original holder as defined in claim 1 wherein said ON-OFF detection mechanism has an original cover ON-OFF detection rod guided along the inner side of said lock lever and elevatable in accordance with the opening and shutting movement of said original cover, whereby said switch for driving said detecting means of original size is actuated by virtue of the elevation of said ON-OFF detection rod.

5. A copying machine equipped with a movable original holder as defined in claim 1 wherein means for reciprocatively driving said original holder is provided, whereby said locking mechanism is released at the commencement of the copying operation and said original holder is moved a small distance in the opposite direction to its normal moving direction by said reciprocating driving means.

* * * * *

UNITED STATES PATENT OFFICE
CERTIFICATE OF CORRECTION

Patent No. 4,764,788         Dated August 16, 1988

Inventor(s) Masahiro WATASHI et al.

It is certified that error appears in the above-identified patent and that said Letters Patent is hereby corrected as shown below:

Column 1, line 12, change "164352/1982" to -- 164352/1981 --;
                  change "138662/1983" to -- 138662/1982 --;
         line 20, change "78849/1982" to -- 78849/1981 --;
                  change "173733/1984" to -- 173733/1983 --.

Signed and Sealed this

Seventh Day of July, 1992

Attest:

DOUGLAS B. COMER

Attesting Officer            Acting Commissioner of Patents and Trademarks